United States Patent
Vasseur et al.

(12) 
(10) Patent No.: US 6,170,313 B1
(45) Date of Patent: Jan. 9, 2001

(54) PROCESS TO PRODUCE INDENTATIONS IN TUBES TOGETHER WITH THE TUBE PRODUCED BY THE USE OF THIS PROCESS

(75) Inventors: Jean-Pierre Vasseur, Route de Dieppe, Saint Vaast d'Equiqueville (FR), 76510; Claude Garconnet; Dominique Garconnet, both of Saint Nicolas d'Aliermont (FR)

(73) Assignees: Etablissements Garconnet; Jean-Pierre Vasseur, both of Saint Nicolas (FR)

( * ) Notice: Under 35 U.S.C. 154(b), the term of this patent shall be extended for 0 days.

(21) Appl. No.: 09/314,279

(22) Filed: May 18, 1999

(30) Foreign Application Priority Data

Jul. 21, 1998 (EP) .................................................. 98401857

(51) Int. Cl.⁷ ..................................................... B21D 17/02
(52) U.S. Cl. ........................... 72/312; 72/370.21; 29/560; 29/897.2
(58) Field of Search ........................... 72/370.21, 370.23, 72/370.24, 312; 29/890.14, 897.2, 243.53, 243.54, 515, 560

(56) References Cited

U.S. PATENT DOCUMENTS

| | | | |
|---|---|---|---|
| 1,615,724 | * 1/1927 | Pierce ...................................... | 29/560 |
| 2,491,119 | * 12/1949 | Lewis ...................................... | 29/560 |
| 3,765,079 | * 10/1973 | Pfefferle ................................. | 29/515 |
| 4,574,610 | * 3/1986 | Hull ....................................... | 72/367 |
| 4,582,259 | * 4/1986 | Hoover ................................... | 72/312 |
| 4,679,850 | 7/1987 | JBianchi et al. . | |

FOREIGN PATENT DOCUMENTS

| | | |
|---|---|---|
| 297 14 315 U | 1/1998 | (DE) . |
| 2 612 096 A1 | 3/1987 | (FR) . |

* cited by examiner

*Primary Examiner*—Daniel C. Crane
(74) *Attorney, Agent, or Firm*—Michael R. Schacht; Hughes & Schacht, P.S.

(57) ABSTRACT

A process by which it is possible to make a sharp-angled indentation on hollow tubes without removing any material, maintaining a constant thickness of tube and also without deforming the external diameter and conserving the fiber orientation of the metal, characterized by the fact that a riveting machine is used, which itself is a well-known type of machine, comprising a riveting head fitted to a spindle operating in conjunction with pressing devices and a fixed half-clamp. The riveting head of this machine is replaced by a former adapted to the profile of the indentation required and in particular to its sharp angle. The tube in which indentations are required (1) is positioned between the former and the fixed half-clamp and the pressure devices are operated, causing movement of the spindle in order to allow indentation of the tube (1).

6 Claims, 3 Drawing Sheets

PROCESS TO PRODUCE INDENTATIONS IN TUBES TOGETHER WITH THE TUBE PRODUCED BY THE USE OF THIS PROCESS

TECHNICAL FIELD

This invention relates to a process by which it is possible to make a sharp-angled indentation on hollow tubes without removing any matrial, maintaining a constant thickness of tube and also without deforming the external diameter and conserving the fibre orientation of the metal.

In many industrial fields, it is necessary to make a series of indentations in tubes for adjustment purposes.

As a non-exhaustive illustration, such indentations are used in the automobile industry when making "frames" for adjustable head restraints for motor vehicles.

In order to make indentations in tubes, processes have already been proposed that involve machining and removing material, a technique which is difficult to apply in the case of hollow tubes, or that use a press, which leads to deformation (caving in) of the tubes, making further machining necessary, and which does not enable sharp-angled indentations to be produced.

The presence of sharp-angled indentations is essential in order to ensure catches are properly engaged and that positions can be adjusted.

Consequently, the "frames" of head restraints for motor vehicles are, as a general rule, currently made from non-tubular, solid cylindrical metal bars, which to a great extent increases their weight and their cost price.

OBJECTS OF THE INVENTION

The purpose of this invention is to resolve these problems by offering a process that makes it possible to make sharp-angled indentations on hollow tubes, without removing any material.

According to this invention, it has been possible, surprisingly, to achieve this objective not by means of a press as has previously been proposed, but by means of a riveting machine which in itself is a well-known machine, comprising a riveting head fitted to a spindle operating in conjunction with pressing devices and a fixed half-clamp.

SUMMARY OF THE INVENTION

The process used in this invention is characterised by the fact that the riveting head of a riveting machine of this type is replaced by a former adapted to the profile of the indentation to be made and in particular to its sharp angle. The tube on which indentations are to be made is inserted between the former and the fixed half-clamp and the pressing devices are activated, causing movement of the spindle, in order to allow indentations to be made in the tube.

Thus by radial deformation it is possible to obtain indentations of various shapes, without removing any material, and to maintain a sharp angle in the side engaged by the catch, without deforming the external diameter of the tube.

One of the most important characteristics of the invention is that the riveting machine is a riveting machine with an epicycloid mechanism and a spherical joint.

When such a machine is used, the indentation former is subjected to a complex movement that can be broken down into a translational movement and an orbital movement.

It has thus been possible to make indentations in tubes with a depth one-and-a-half times their thickness, without perforating the deformed part.

Another characteristic of the invention is that the spindle of the riveting machine is fitted with a holding-down clamp, the front part of which secures the tube in which indentations are to be made and holds it tightly against the fixed half-clamp.

Another characteristic of the invention is that rotation movement of the indentation former is prevented by means of a stabilising device.

There are no limits in terms of the maximum and minimum tube diameter that can be handled by the process. The depth and the surface area to be obtained determine the power of the riveting machine.

By way of example, tests have been carried out on steel tubes with an external diameter of 11.70 mm and an internal diameter of 7.80 mm. A force of 500 daN was required in order to obtain indentations 2 mm in depth with an ware of 50 mm$^2$.

The invention also relates to a hollow tube produced by means of the process described above.

Such a tube is characterised by the fact that it has sharp-angled indentations which have been made without removing material, maintaining constant tube thickness.

BRIEF DESCRIPTION OF THE DRAWINGS

The characteristics of the process and the tubes covered by the invention will be described in greater detail by referring to the appended drawings, in which.

DETAILED DESCRIPTION OF THE INVENTION

Figure 1:
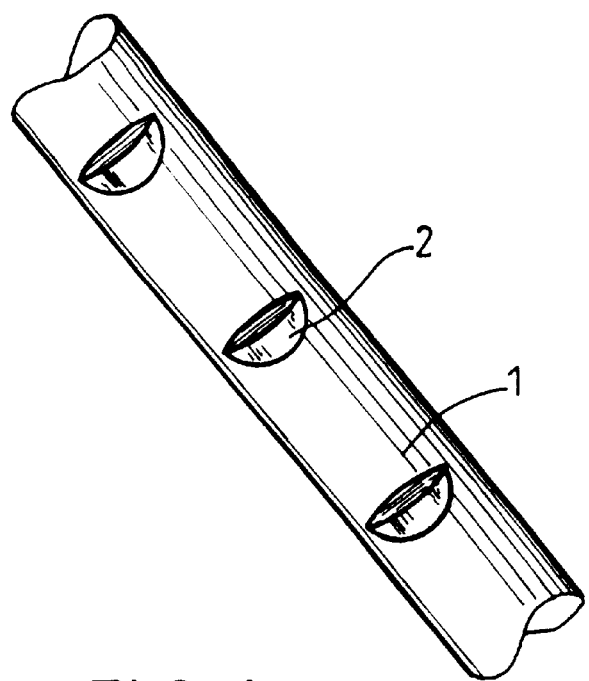
FIG. 1 is a perspective view of a tube as according to the invention.

According to FIG. 1, the surface of the tube (1) has a series of indentations (2) of a determined profile.

Figure 2:
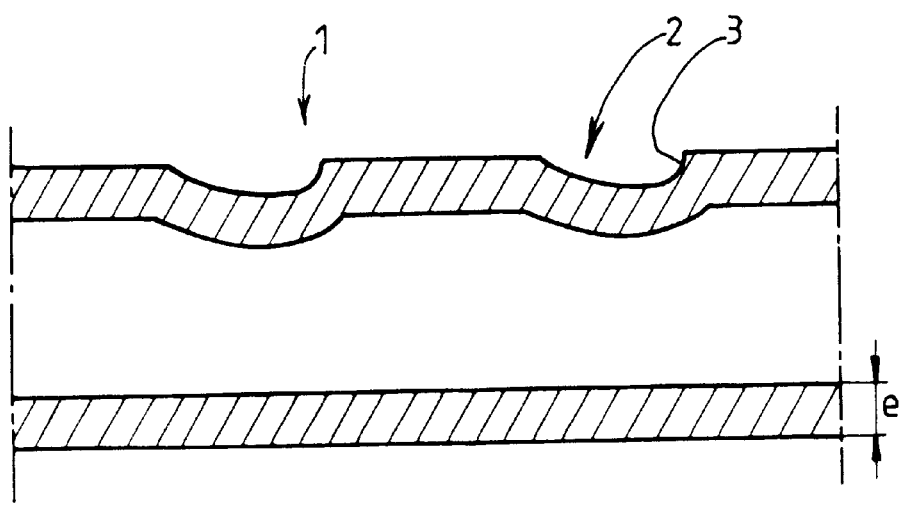
FIG. 2 is a section through this tube.

According to FIG. 2, the indentations (2) have sharp angles (3) and are made without removing material so that the thickness of the tube remains constant.

Figures 3, 3A:
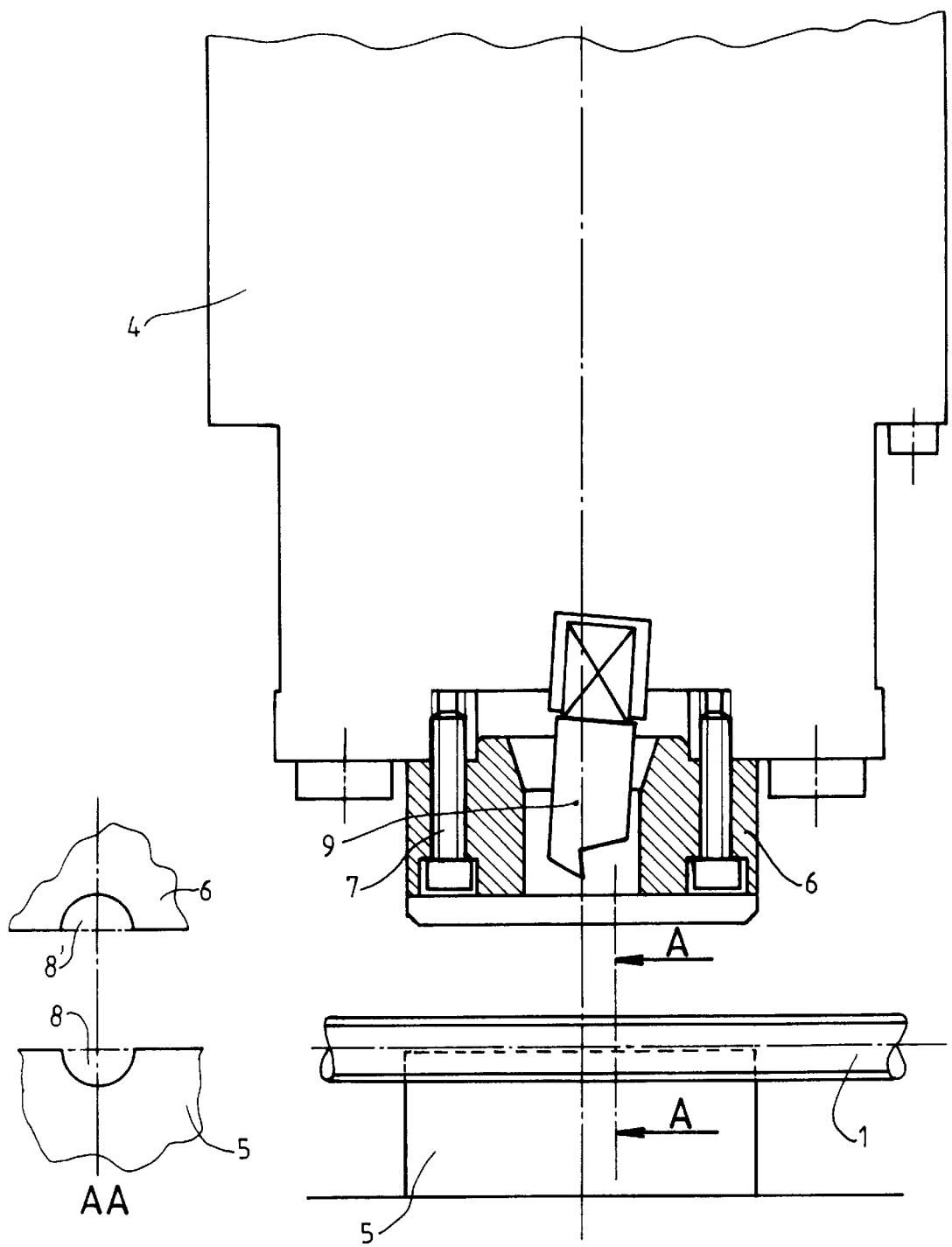
FIG. 3 is a schematic section of the riveting machine used in this process.
FIG. 3a is a schematic section of FIG. 3 along axis A—A.
Figure 4A:
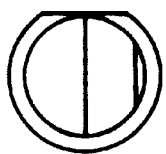
FIGS. 4 and 4a, 5 and 5a, 6 and 6a show three examples of indentation formers as sections and views from below, respectively.
Figure 5A:
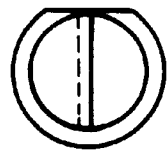
Figure 6A:
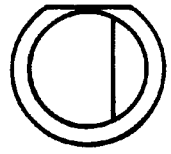
Figure 4:
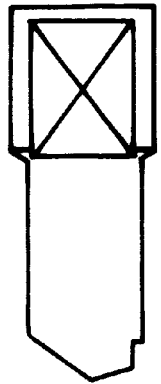
Figure 5:
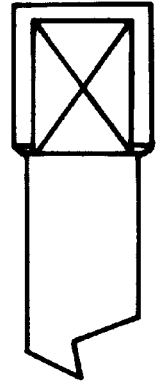
Figure 6:
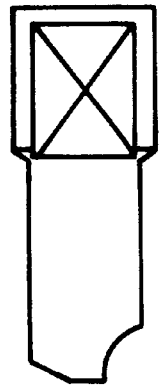

According to FIG. 3, the riveting machine (4) used to make indentations in the tubes (1) is a machine with an epicycloid mechanism and a spherical joint, which is a well-known type of machine and which, for this reason, will not be described in detail in the context of this statement.

This machine is equipped, firstly, with a fixed half-clamp (5) and secondly a moving half-clamp or holding-down device (6) fixed to the head of the machine (4) by means of a screw (7) in conjunction with sleeves or springs made of rubber.

According to FIG. 3a, the two parts (5, 6) have grooves (8, 8') located opposite each other in order to hold the tube (1) in which indentations are to be made.

Furthermore, and as shown in FIG. 3, the machine (4) is also fitted with a former (9) fitted to the nose of the same.

FIGS. 4, 4a, 5, 5a, 6 and 6a show examples of former profiles (9) which can be used according to the type of indentation to be produced.

What is claimed is:

1. A process for making a sharp-angled indentation on a hollow metal tube, without removing any material, maintaining a constant thickness of the tube and also without deforming the external diameter and conserving the fiber orientation of the metal from which the tube is made, characterized in that the process comprises the steps of, providing a riveting machine, the riveting machine having an epicycloid mechanism and a spherical joint and comprising a riveting head fitted to a spindle, operating in conjunction with pressing devices and a fixed half-clamp, replacing the spindle of the riveting machine with a sharp angled former adapted to the profile of the indentation to be made and to the former's sharp angle, inserting the tube on which indentations are to be made between the former and the fixed half-clamp and activating the pressing devices, causing movement of the spindle in order to allow indentations to be made in the tube.

2. A process as described in claim 1, characterised in that the spindle of the riveting machine is fitted with a holding-down clamp, the front part of which secures the tube in which indentations are to be made and holds it tightly against the fixed half-clamp.

3. A process as described in claim 1, characterised in that the riveting machine effects riveting by a rotational movement and the rotational movement of the indentation former is prevented by means of a stabilising device.

4. A process as described in claim 2, characterised in that the riveting machine effects riveting by a rotational movement and rotational movement of the indentation former is prevented by means of a stabilising device.

5. A process for making a sharp-angled indentation on a hollow metal tube, without removing any material, maintaining a constant thickness of the tube and also without deforming the external diameter and conserving the fiber orientation of the metal from which the tube is made, characterized in that the process comprises the steps of, providing a riveting machine, the riveting machine effecting riveting by a rotational movement and comprising a riveting head fitted to a spindle, operating in conjunction with pressing devices and a fixed half-clamp, replacing the spindle of the riveting machine with a sharp angled former adapted to the profile of the indentation to be made and the former's sharp angle, inserting the tube on which indentations are to be made between the former and the fixed half-clamp and activating the pressing devices causing movement of the spindle in order to allow indentations to be made in the tube and preventing rotational movement of the indentation former by means of a stabilizing device.

6. A process for making a sharp-angled indentation on a hollow metal tube, without removing any material, maintaining a constant thickness of the tube and also without deforming the external diameter and conserving the fiber orientation of the metal from which the tube is made, characterized in that the process comprises the steps of, providing a riveting machine, the riveting machine effecting riveting by a rotational movement and comprising a riveting head fitted to a spindle, operating in conjunction with pressing devices and a fixed half-clamp replacing the spindle of the riveting machine with a sharp angled former adapted to the profile of the indentation to be made and the former's sharp angle, inserting the tube on which indentations are to be made between the former and the fixed half-clamp and fitting the spindle of the riveting machine with a holding-down clamp, the front part of which secures the tube in which indentations are to be made and holds it tightly against the fixed half-clamp, activating the pressing devices causing movement of the spindle in order to allow indentations to be made in the tube and preventing rotational movement of the indentation former by means of a stabilizing device.

* * * * *